(12) United States Patent
Goenka et al.

(10) Patent No.: US 12,079,262 B2
(45) Date of Patent: *Sep. 3, 2024

(54) COMPUTERIZED SYSTEM AND METHOD FOR INTEREST PROFILE GENERATION AND DIGITAL CONTENT DISSEMINATION BASED THEREFROM

(71) Applicant: YAHOO AD TECH LLC, Dulles, VA (US)

(72) Inventors: Mohit Goenka, Santa Clara, CA (US); Ashish Khushal Dharamshi, Sunnyvale, CA (US); Nikita Varma, Milpitas, CA (US)

(73) Assignee: YAHOO AD TECH LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/140,337

(22) Filed: Jan. 4, 2021

(65) Prior Publication Data

US 2021/0124771 A1  Apr. 29, 2021

Related U.S. Application Data

(63) Continuation of application No. 16/123,337, filed on Sep. 6, 2018, now Pat. No. 10,885,090.

(51) Int. Cl.
*G06F 16/00* (2019.01)
*G06F 16/31* (2019.01)
(Continued)

(52) U.S. Cl.
CPC ............ *G06F 16/38* (2019.01); *G06F 16/313* (2019.01); *G06F 16/337* (2019.01);
(Continued)

(58) Field of Classification Search
CPC ...... G06F 16/313; G06F 16/337; G06F 16/38; G06F 16/9024; G06F 16/9535;
(Continued)

(56) References Cited

U.S. PATENT DOCUMENTS

2011/0093415 A1* 4/2011 Rhee .................... G06F 16/951
706/54
2011/0288912 A1* 11/2011 McCrea ............ G06Q 30/0217
705/14.2

(Continued)

*Primary Examiner* — Dinku W Gebresenbet
(74) *Attorney, Agent, or Firm* — James J. DeCarlo; Greenberg Traurig, LLP

(57) ABSTRACT

Disclosed are systems and methods for improving interactions with and between computers in content providing, searching and/or hosting systems supported by or configured with devices, servers and/or platforms. The disclosed systems and methods provide a novel framework for compiling, updating and dynamically managing a confidence graph for a user that leads to generation of a scored interest profile for the user that content providers can utilize as a basis for disseminating their proprietary digital content. The disclosed confidence graph provides a scored interest profile for each user that is based on authenticated user data derived from an inbox of the user. The confidence graph is not only derived from authenticated data, but is also dynamic and evolves simultaneously with changing user interests. Thus, digital content is selected and transmitted to users based on the current, real-time digital data reflecting their current interests as reflected by their inbox activity.

20 Claims, 5 Drawing Sheets

(51) Int. Cl.
*G06F 16/335* (2019.01)
*G06F 16/38* (2019.01)
*G06F 16/901* (2019.01)
*G06F 40/205* (2020.01)
*H04L 51/42* (2022.01)

(52) U.S. Cl.
CPC ........ *G06F 16/9024* (2019.01); *G06F 40/205* (2020.01); *H04L 51/42* (2022.05)

(58) Field of Classification Search
CPC ....... G06F 40/205; H04L 51/20; H04L 51/22; H04L 51/42; H04L 51/222
See application file for complete search history.

(56) References Cited

U.S. PATENT DOCUMENTS

| | | | |
|---|---|---|---|
| 2012/0047087 A1* | 2/2012 | Amidon | G01C 21/34 705/347 |
| 2012/0290662 A1* | 11/2012 | Weber | G06Q 10/107 715/835 |
| 2015/0100356 A1* | 4/2015 | Bessler | G06Q 10/0631 705/7.12 |
| 2016/0087924 A1* | 3/2016 | Ramalingam | H04L 51/04 709/206 |
| 2016/0337300 A1* | 11/2016 | Ossia | H04L 51/224 |
| 2019/0171693 A1* | 6/2019 | Dotan-Cohen | H04L 67/306 |

\* cited by examiner

COMPUTERIZED SYSTEM AND METHOD FOR INTEREST PROFILE GENERATION AND DIGITAL CONTENT DISSEMINATION BASED THEREFROM

This patent application claims the benefit of and is a continuation of U.S. patent application Ser. No. 16/123,337, filed on Sep. 6, 2018, now U.S. Pat. No. 10,885,090, which is incorporated by reference herein in its entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

FIELD

The present disclosure relates generally to improving the performance of content hosting and providing devices, systems and/or platforms by modifying the capabilities and providing non-native functionality to such devices, systems and/or platforms through a novel and improved framework for mapping and authenticating user data, generating and updating a user profile based on such data, then providing digital content based therefrom.

BACKGROUND

Content providers typically utilize user data to provide users with what is deemed to be content that is of interest to a user. However, conventional techniques implemented by these content providers have shortcomings in that the data they are using is often incomplete and not authentic (or verified).

Typically, user data is compiled into an interest graph that is ultimately leveraged to match content provider's content to the interests of users represented by the interest graph. Conventional graphing techniques, specifically those related to interest graphs, however, are plagued by deficiencies in how comprehensive they are in reflecting an up-to-date digital representation of a user, the user's activities and ultimately his/her interests. Such interest graphs also fail to account for factors indicating how authentic and dynamic the user data is.

A majority of content providers (e.g., entities sending users digital content, including third party providers, services and advertisers, for example), simply estimate user interests by relying on methods that track user activity, analyze user responses to surveys or collect data from on-line transactions (e.g., financial or purchase transactions). Some providers also mainly rely on data collected and aggregated from other parties (e.g., credit card companies or content delivery or social platforms) as a basis for what they understand a user is interested in. Each of these methodologies have their own shortcomings.

For example, user activity tracked through cookies and click actions usually results in inaccurate interest graphs. That is, they may represent, at most, initial activity by a user but do not provide nor do they include how the activity concluded (e.g., they are not followed through with final transactions). Also, devices may be shared among users, which results in the compilation of erroneous interest graphs that are influenced by the online activity of more than one user. Further, a non-trivial number of ad clicks are accidental (especially given new ad formats that are interspersed throughout articles), and clicks on content articles themselves could be highly misleading given clickbait articles that are now generously distributed by demand aggregators.

In another example, users usually respond to interest surveys by providing inaccurate/aspirational responses. For example, a user may not actually be interested in architecture, but aspires to be knowledgeable about architecture in general; therefore, a response to a survey indicating an interest in articles about architecture (on, for example, Flipboard™) does not provide an accurate or full portrayal of a user.

In another example, collecting data from financial transactions from e-commerce platforms provides very limited data unless the provider has the scale of Amazon® or Walmart®. Even so, if a user is purchasing content from, for example, Amazon, that is actually provided by a third party affiliate, Amazon may not have the complete details of what is purchased, when it was purchased, and/or if it was actually delivered or returned.

In yet another example, data from credit card providers or data aggregators suffer from similar failings listed above. For example, families usually share credit cards and transactions from different individuals are attached to a single account. Data aggregators rely again on estimation models based on user activity perceived to be authentic without the final transactions happening on their platforms. This leads to incomplete, inaccurate data about a user that could lead to a user receiving inappropriate or wasteful content.

SUMMARY

The disclosed systems and methods provide a technical solution to existing technical problems, especially those highlighted above, by providing an improved framework for mapping and leveraging a user's data via an interest profile generation technique based on a generated confidence graph. As discussed above, conventional techniques rely upon interest graphs for such purposes; however, interest graphs lack the accountability and robust data disclosure that confidence graphs afford content providers.

According to embodiments of the instant disclosure, confidence graphs are generated from user data (e.g., a user's inbox), and they do not suffer from the recognized shortcomings of interest graphs. Rather than attempting to map a user's interests on a network via the technically insufficient tracking, surveying, collecting and aggregation techniques interest graphs utilize, as discussed above, confidence graphs are drawn from user inbox data, which most, if not all, interest graphs ignore. Inboxes themselves are extremely personal and directly attached to the user. There is a clear unadulterated connection to an individual's interests and rarely are personal email inboxes shared between individuals to muddy up the data that may be gleaned from a personal inbox.

Indeed, inboxes provide rich transactional information from a multitude of platforms, which avails providers to information that clearly points to a user's real-time interests in, for example, travel, books, clothes, electronics, food, and the like. In addition, the frequency of such transactions are themselves a strong marker of a user's interests, and mining a user's inbox and extracting records of such occurrences provides a verified account of what the user actually performed (rather than an estimate of what they may perform, as in interest models).

For example, a user might like pages for book clubs on Facebook® and might have a Goodreads™ account. This is the type of data interest graphs rely upon, which does not provide definitive indicators as to what activity and/or interests a user actually is involved/interested in. However, the disclosed confidence graphs reliance on emails (from an inbox of the user) from libraries, online bookstores like Amazon, iBooks and the like, for example, not only authenticate the user as a bibliophile but also provide the ability to generate and rely upon vectors into the user's specific interest into categories like fiction, biographies, finance and the like.

The disclosed confidence graphs are not a static, point-in-time profile of the user, as interest graphs are. Rather they change based on the user's evolution as a person and their changing interests with the passage of time. Most of the data sources interest graphs rely on do not factor historical information of the user in addition to current user activity, whereas data from a user's inbox does not suffer from such deficiencies.

Overall, content providers cannot verify interest graphs as they do not have data on confirmed user actions (e.g. final transactions on their e-commerce platform) to verify the authenticity. However, a user's inbox is the ultimate collection of verified online transactions, interactions and actions. Thus, the disclosed systems and methods can extract and evaluate from the inbox to accurately pinpoint/verify user interests for purposes of generating the disclosed confidence graph(s). The key here is the use the multitude of data available about a user from their inbox to generate confidence graphs. Vectors, such as, for example, age of account, verified online transactions, subscribed newsletters opened, articles clicked on, among others, can be used to generate confidence scores which can then be translated into dynamic interest profiles for users that can be used by content providers in real time.

Thus, the disclosed systems and methods provide an improved framework that utilizes previously untapped resources provided by a user's inbox in order to compile confidence graphs that are dynamically generated and updated (e.g., based on incoming/outgoing messages from a user's inbox), which provides a real-time indicator of a user's evolution in real-world and online interests, activities, tastes and the like.

In accordance with one or more embodiments, the instant disclosure provides computerized methods for mapping and authenticating user data, generating and updating a user profile based on such data, then providing digital content based therefrom, as well as a non-transitory computer-readable storage medium for carrying out the above mentioned technical steps of the framework's functionality. The non-transitory computer-readable storage medium has tangibly stored thereon, or tangibly encoded thereon, computer readable instructions that when executed by a device (e.g., application server, email server, content server and/or client device, and the like) cause at least one processor to perform a method for a novel and improved framework for performing the confidence graphing, interest profile building and content dissemination based therefrom.

In accordance with one or more embodiments, a system is provided that comprises one or more computing devices configured to provide functionality in accordance with such embodiments. In accordance with one or more embodiments, functionality is embodied in steps of a method performed by at least one computing device. In accordance with one or more embodiments, program code (or program logic) executed by a processor(s) of a computing device to implement functionality in accordance with one or more such embodiments is embodied in, by and/or on a non-transitory computer-readable medium.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DESCRIPTION OF EMBODIMENTS

Figure 1:
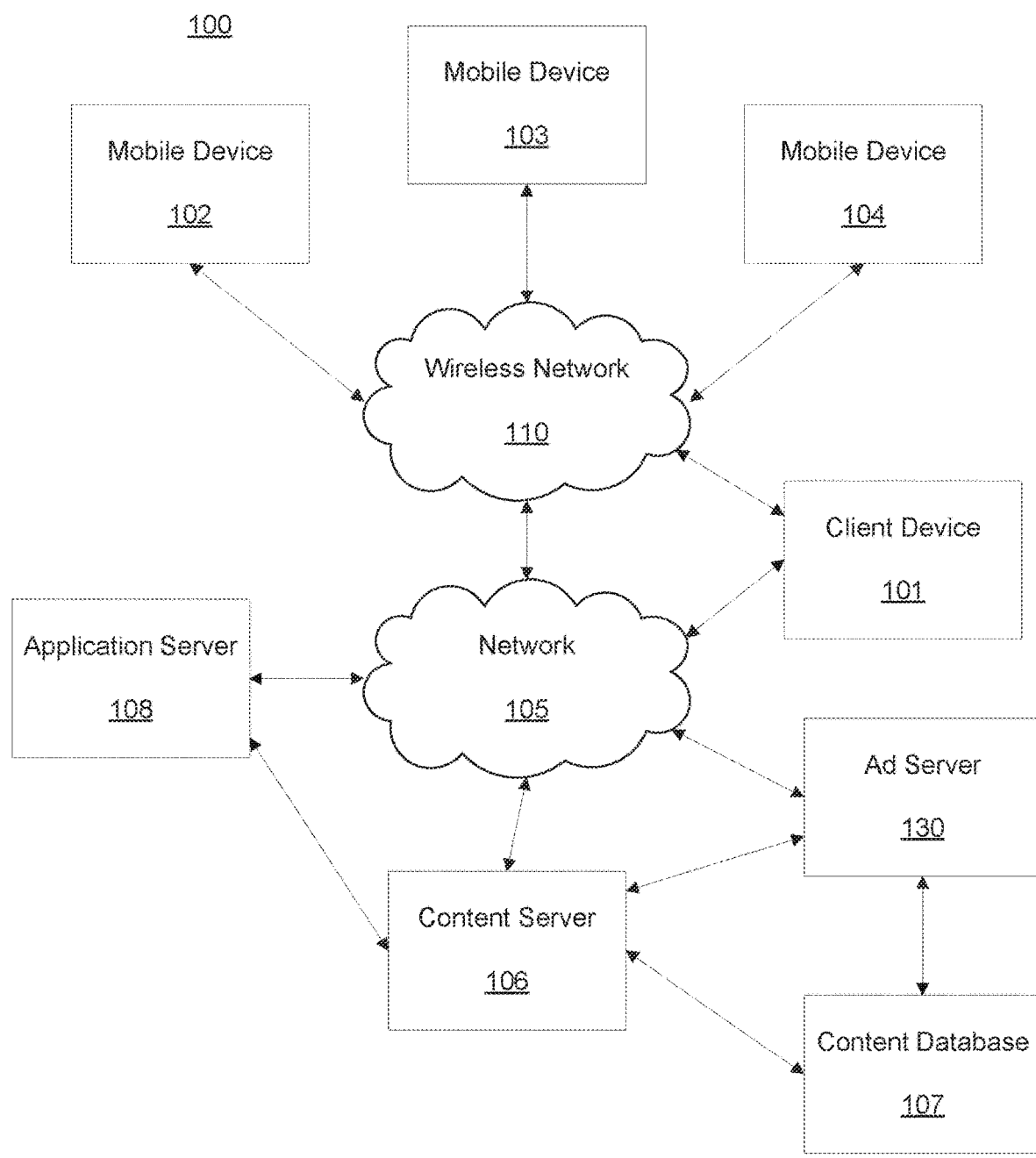
FIG. 1 is a schematic diagram illustrating an example of a network within which the systems and methods disclosed herein could be implemented according to some embodiments of the present disclosure.

The present disclosure will now be described more fully hereinafter with reference to the accompanying drawings, which form a part hereof, and which show, by way of non-limiting illustration, certain example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure a non-transitory computer readable medium (or computer-readable storage medium/media) stores computer data, which data can include computer program code (or computer-executable instructions) that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

For the purposes of this disclosure a "network" should be understood to refer to a network that may couple devices so that communications may be exchanged, such as between a server and a client device or other types of devices, including between wireless devices coupled via a wireless network, for example. A network may also include mass storage, such as network attached storage (NAS), a storage area network (SAN), a content delivery network (CDN) or other forms of computer or machine readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may interoperate within a larger network.

For purposes of this disclosure, a "wireless network" should be understood to couple client devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, $4^{th}$ or $5^{th}$ generation (2G, 3G, 4G or 5G) cellular technology, Bluetooth, 802.11b/g/n, or the like. Network access technologies may enable wide area coverage for devices, such as client devices with varying degrees of mobility, for example.

In short, a wireless network may include virtually any type of wireless communication mechanism by which signals may be communicated between devices, such as a client device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a client (or consumer or user) device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A client device may vary in terms of capabilities or features. Claimed subject matter is intended to cover a wide range of potential variations, such as a web-enabled client device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display, for example.

A client device may include or may execute a variety of possible applications, such as a client software application enabling communication with other devices. A client device may also include or execute an application to communicate content, such as, for example, textual content, multimedia content, or the like. A client device may also include or execute an application to perform a variety of possible tasks, such as messaging functionality, browsing, searching, playing, streaming or displaying various forms of content, including locally stored or uploaded messages, images and/or video, or games (such as live broadcasts of professional sporting events).

As discussed herein, reference to an "advertisement" should be understood to include, but not be limited to, digital media content embodied as a media item that provides information provided by another user, service, third party, entity, and the like. Such digital ad content can include any type of known or to be known media renderable by a computing device, including, but not limited to, video, text, audio, images, and/or any other type of known or to be known multi-media item or object. In some embodiments, the digital ad content can be formatted as hyperlinked multi-media content that provides deep-linking features and/or capabilities. Therefore, while some content is referred to as an advertisement, it is still a digital media item that is renderable by a computing device, and such digital media item comprises content relaying promotional content provided by a network associated party.

The principles described herein may be embodied in many different forms. The disclosed systems and methods provide advanced mechanisms for compiling, updating and dynamically managing a confidence graph for a user that leads to a scored interest profile for the user that content providers can utilize as a basis for disseminating their proprietary digital content. This can lead to increased efficiencies in the manner content is sent to users in that network resources can be salvaged by avoiding sending particular users content that they are not actually interested in.

The disclosed systems and methods can effectuate a lower throughput on a network and can remedy storage capacity issues by ensuring that only viable messages with verified content are generated and sent for hosting in user accounts. The increased efficiency in how devices operate in disseminating and receiving content, as well as the reduction of network bandwidth will be evidenced from the maximization of device and network resources discussed herein.

Confidence Graphs have myriad applications and solve two primary deficiencies that current user interest graphs are plagued with: i) authenticity and ii) dynamism.

With regard to the i) authenticity issue affecting current systems, current interest graph techniques involve interest graphs being generated based on estimative/probabilistic data models. Taking estimates or probabilities of user data leads to inefficiencies in how the data is handled and results in inaccuracies of what the data is actually representing. Confidence Graphs, on the other hand, are based on authenticated user data based on a user's personal inbox. Confidence graphs are drawn from real transactional data mined and extracted from the user's account. The older the user's account, the stronger and more robust interest signals the user data included in an inbox is providing. Confidence graphs cover data from varied platforms, such as, for example, Facebook®, Twitter®, Amazon®, Walmart®, iTunes®, Google Play®, Costco®, Doordash®, Opentable®, Expedia®, and the like. This plethora of data resources and types can both serve as an authentication tool to verify and validate the user data and as the primary tool to map user interests.

With regard to the ii) dynamism issue affecting current systems, unlike interest graphs, confidence graphs (as mentioned above) are not point-in-time scores or mappings of user interests. Rather, confidence graphs evolve as the user's interests change and adapt. For example, a user that is a college student would be interested in applying for low APR credit cards that allow him/her to build a credit history. However, as a professional with a few years' experience, the need might slowly evolve to credit cards that provide cashback or travel rewards. Based on vectors derived from messages in a user's inbox, such as email messages opened, the current credit card the user has applied for, the stores the user frequently purchases from and users with similar interests and profiles, the confidence graph for the user can change to dynamically point to different interests at different points in the user's consumer lifecycle to meet his/her evolving needs and interests.

Thus, according to embodiments of the instant disclosure, a confidence graph provides a scored interest profile for each user that is based on authenticated user data that can have a variety of applications. In addition to being derived from authenticated data, it is also dynamic and evolves simultaneously with changing user interests. According to some embodiments, a confidence graph can be cross-verified at scale against other users with similar profile scores to validate the insights determined therein.

As discussed in more detail below at least in relation to FIG. 6, according to some embodiments, information associated with, derived from, or otherwise identified from, during or as a result of generation and dynamic updating of a user's scored interest profile (via the confidence graph generation), as discussed herein, can be used for monetization purposes and targeted advertising when providing, delivering or enabling such devices access to content or services over a network. Providing targeted advertising to users associated with such discovered content can lead to an increased click-through rate (CTR) of such ads and/or an increase in the advertiser's return on investment (ROI) for serving such content provided by third parties (e.g., digital advertisement content provided by an advertiser, where the advertiser can be a third party advertiser, or an entity directly associated with or hosting the systems and methods discussed herein).

Certain embodiments will now be described in greater detail with reference to the figures. In general, with reference to FIG. 1, a system 100 in accordance with an embodiment of the present disclosure is shown. FIG. 1 shows components of a general environment in which the systems and methods discussed herein may be practiced. Not all the components may be required to practice the disclosure, and variations in the arrangement and type of the components may be made without departing from the spirit or scope of the disclosure. As shown, system 100 of FIG. 1 includes local area networks ("LANs")/wide area networks ("WANs")—network 105, wireless network 110, mobile devices (client devices) 102-104 and client device 101. FIG. 1 additionally includes a variety of servers, such as content server 106, application (or "App") server 108 and advertising ("ad") server 130.

One embodiment of mobile devices 102-104 may include virtually any portable computing device capable of receiving and sending a message over a network, such as network 105, wireless network 110, or the like. Mobile devices 102-104 may also be described generally as client devices that are configured to be portable. Thus, mobile devices 102-104 may include virtually any portable computing device capable of connecting to another computing device and receiving information, as discussed above. As such, mobile devices 102-104 typically range widely in terms of capabilities and features.

Mobile devices 102-104 also may include at least one client application that is configured to receive content from another computing device. In some embodiments, mobile devices 102-104 may also communicate with non-mobile client devices, such as client device 101, or the like. In one embodiment, such communications may include sending and/or receiving messages, searching for, viewing and/or sharing photographs, digital images, audio clips, video clips, or any of a variety of other forms of communications.

Client devices 101-104 may be capable of sending or receiving signals, such as via a wired or wireless network, or may be capable of processing or storing signals, such as in memory as physical memory states, and may, therefore, operate as a server.

Wireless network 110 is configured to couple mobile devices 102-104 and its components with network 105. Wireless network 110 may include any of a variety of wireless sub-networks that may further overlay stand-alone ad-hoc networks, and the like, to provide an infrastructure-oriented connection for mobile devices 102-104.

Network 105 is configured to couple content server 106, application server 108, or the like, with other computing devices, including, client device 101, and through wireless network 110 to mobile devices 102-104. Network 105 is enabled to employ any form of computer readable media or network for communicating information from one electronic device to another.

The content server 106 may include a device that includes a configuration to provide any type or form of content via a network to another device. Devices that may operate as content server 106 include personal computers desktop computers, multiprocessor systems, microprocessor-based or programmable consumer electronics, network PCs, servers, and the like. Content server 106 can further provide a variety of services that include, but are not limited to, email services, instant messaging (IM) services, streaming and/or downloading media services, search services, photo services, web services, social networking services, news services, third-party services, audio services, video services, SMS services, MIMS services, FTP services, voice over IP (VOIP) services, or the like.

An ad server 130 comprises a server that stores online advertisements for presentation to users. "Ad serving" refers to methods used to place online advertisements on websites, in applications, or other places where users are more likely to see them, such as during an online session or during computing platform use, for example. Various monetization techniques or models may be used in connection with sponsored advertising, including advertising associated with user data. Such sponsored advertising includes monetization techniques including sponsored search advertising, non-sponsored search advertising, guaranteed and non-guaranteed delivery advertising, ad networks/exchanges, ad targeting, ad serving and ad analytics. Such systems can incorporate near instantaneous auctions of ad placement opportunities during web page creation, (in some cases in less than 500 milliseconds) with higher quality ad placement opportunities resulting in higher revenues per ad. That is advertisers will pay higher advertising rates when they believe their ads are being placed in or along with highly relevant content that is being presented to users. Reductions in the time needed to quantify a high quality ad placement offers ad platforms competitive advantages. Thus, higher speeds and more relevant context detection improve these technological fields.

For example, a process of buying or selling online advertisements may involve a number of different entities, including advertisers, publishers, agencies, networks, or developers. To simplify this process, organization systems called "ad exchanges" may associate advertisers or publishers, such as via a platform to facilitate buying or selling of online advertisement inventory from multiple ad networks. "Ad networks" refers to aggregation of ad space supply from publishers, such as for provision en-masse to advertisers. For web portals like Yahoo! ®, advertisements may be displayed on web pages or in apps resulting from a user-defined search based at least in part upon one or more search terms. Advertising may be beneficial to users, advertisers or web portals if displayed advertisements are relevant to interests of one or more users. Thus, a variety of techniques have been developed to infer user interest, user intent or to subsequently target relevant advertising to users. One approach to presenting targeted advertisements includes employing demographic characteristics (e.g., age, income, gender, occupation, etc.) for predicting user behavior, such as by group. Advertisements may be presented to users in a targeted audience based at least in part upon predicted user behavior(s).

Another approach includes profile-type ad targeting. In this approach, user profiles specific to a user may be generated to model user behavior, for example, by tracking a user's path through a web site or network of sites, and compiling a profile based at least in part on pages or advertisements ultimately delivered. A correlation may be identified, such as for user purchases, for example. An identified correlation may be used to target potential purchasers by targeting content or advertisements to particular users. During presentation of advertisements, a presentation system may collect descriptive content about types of advertisements presented to users. A broad range of descriptive content may be gathered, including content specific to an advertising presentation system. Advertising analytics gathered may be transmitted to locations remote to an advertising presentation system for storage or for further evaluation. Where advertising analytics transmittal is not immediately available, gathered advertising analytics may be stored by an advertising presentation system until transmittal of those advertising analytics becomes available.

In some embodiments, users are able to access services provided by servers 106, 108 and/or 130. This may include in a non-limiting example, authentication servers, search servers, email servers, social networking services servers, SMS servers, IM servers, MMS servers, exchange servers, photo-sharing services servers, and travel services servers, via the network 105 using their various devices 101-104.

In some embodiments, applications, such as a mail application (e.g., Yahoo! Mail®, Gmail®, and the like), blog, photo or social networking application (e.g., Facebook®, Twitter® and the like), search application (e.g., Yahoo! ® Search), and the like, can be hosted by the application server 108 (or content server 106 and the like).

Thus, the application server 108, for example, can store various types of applications and application related information including application data and user profile information (e.g., identifying and behavioral information associated with a user). It should also be understood that content server 106 can also store various types of data related to the content and services provided by content server 106 in an associated content database 107, as discussed in more detail below.

Embodiments exist where the network 105 is also coupled with/connected to a Trusted Search Server (TSS) which can be utilized to render content in accordance with the embodiments discussed herein. Embodiments exist where the TSS functionality can be embodied within servers 106, 108 and/or 130.

Moreover, although FIG. 1 illustrates servers 106, 108 and 130 as single computing devices, respectively, the disclosure is not so limited. For example, one or more functions of servers 106, 108 and/or 130 may be distributed across one or more distinct computing devices. Moreover, in one embodiment, servers 106, 108 and/or 130 may be integrated into a single computing device, without departing from the scope of the present disclosure.

Figure 2:
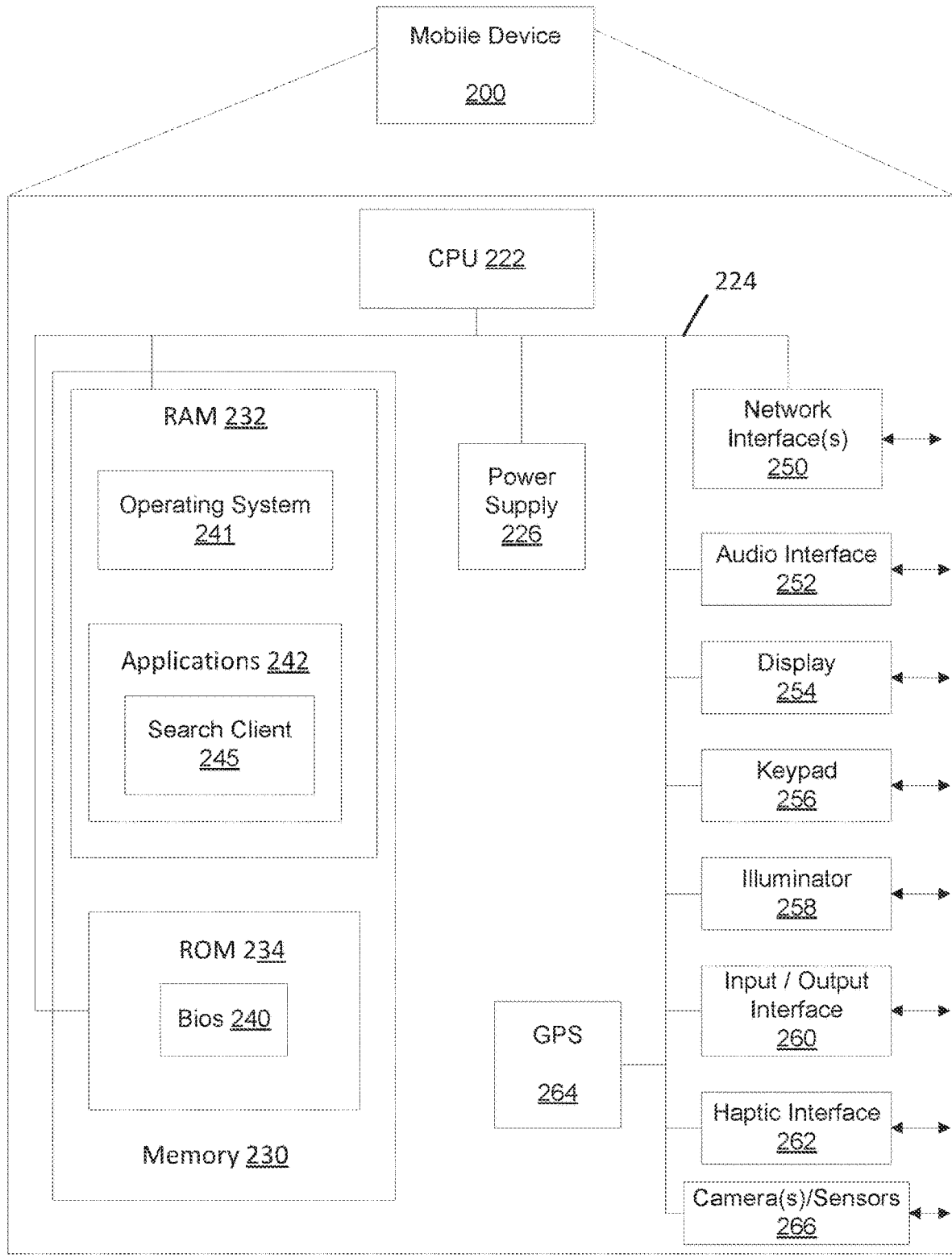
FIG. 2 depicts is a schematic diagram illustrating an example of client device in accordance with some embodiments of the present disclosure.

FIG. 2 is a schematic diagram illustrating a client device showing an example embodiment of a client device that may be used within the present disclosure. Client device 200 may include many more or less components than those shown in FIG. 2. However, the components shown are sufficient to disclose an illustrative embodiment for implementing the present disclosure. Client device 200 may represent, for example, client devices discussed above in relation to FIG. 1.

As shown in the figure, Client device 200 includes a processing unit (CPU) 222 in communication with a mass memory 230 via a bus 224. Client device 200 also includes a power supply 226, one or more network interfaces 250, an audio interface 252, a display 254, a keypad 256, an illuminator 258, an input/output interface 260, a haptic interface 262, an optional global positioning systems (GPS) receiver 264 and a camera(s) or other optical, thermal or electromagnetic sensors 266. Device 200 can include one camera/sensor 266, or a plurality of cameras/sensors 266, as understood by those of skill in the art. The positioning of the camera(s)/sensor(s) 266 on device 200 can change per device 200 model, per device 200 capabilities, and the like, or some combination thereof. Power supply 226 provides power to Client device 200.

Client device 200 may optionally communicate with a base station (not shown), or directly with another computing device. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Keypad 256 may comprise any input device arranged to receive input from a user. Illuminator 258 may provide a status indication and/or provide light.

Client device 200 also comprises input/output interface 260 for communicating with external. Input/output interface 260 can utilize one or more communication technologies, such as USB, infrared, Bluetooth™, or the like. Haptic interface 262 is arranged to provide tactile feedback to a user of the client device.

Optional GPS transceiver 264 can determine the physical coordinates of Client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of Client device 200 on the surface of the Earth. In one embodiment, however, Client device may through other components, provide other information that may be employed to determine a physical location of the device, including for example, a MAC address, Internet Protocol (IP) address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of Client device 200. The mass memory also stores an operating system 241 for controlling the operation of Client device 200

Memory 230 further includes one or more data stores, which can be utilized by Client device 200 to store, among other things, applications 242 and/or other information or data. For example, data stores may be employed to store information that describes various capabilities of Client device 200. The information may then be provided to another device based on any of a variety of events, including being sent as part of a header (e.g., index file of the HLS stream) during a communication, sent upon request, or the like. At least a portion of the capability information may also be stored on a disk drive or other storage medium (not shown) within Client device 200.

Applications 242 may include computer executable instructions which, when executed by Client device 200, transmit, receive, and/or otherwise process audio, video, images, and enable telecommunication with a server and/or another user of another client device. Applications 242 may further include search client 245 that is configured to send, to receive, and/or to otherwise process a search query and/or search result.

Having described the components of the general architecture employed within the disclosed systems and methods, the components' general operation with respect to the disclosed systems and methods will now be described below with reference to FIGS. 3-8.

Figure 3:
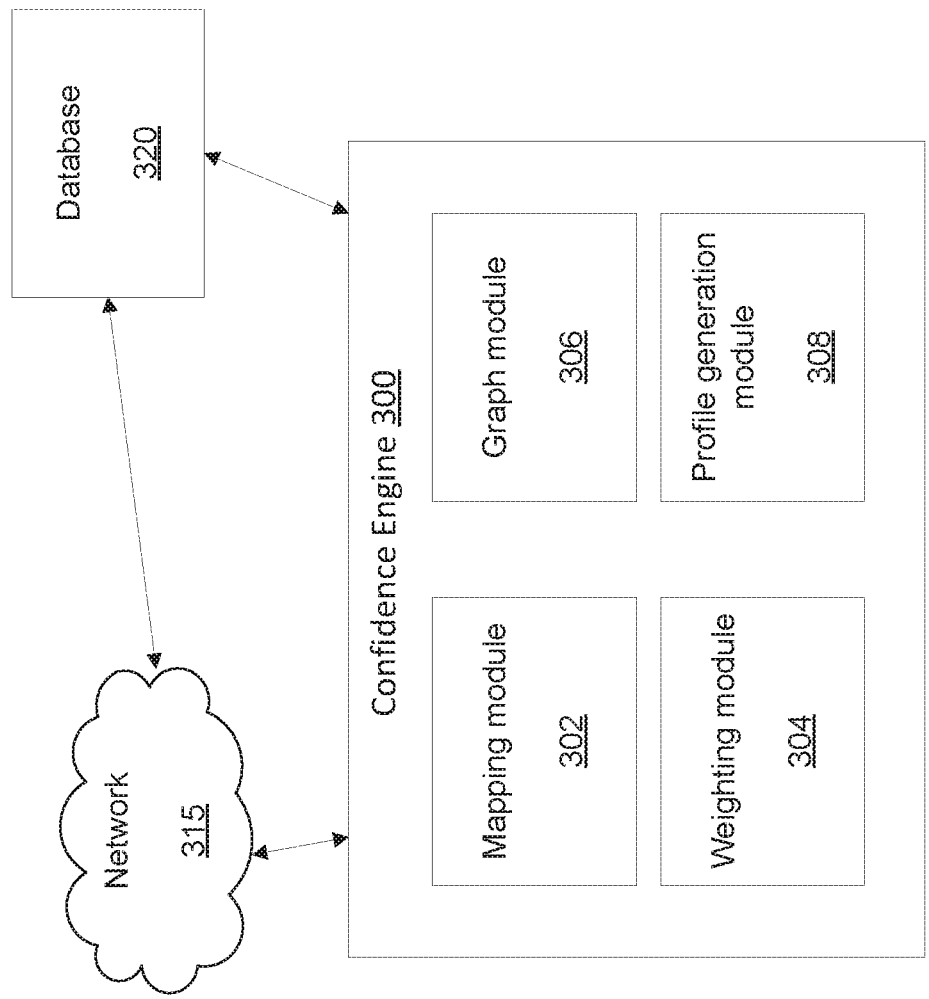
FIG. 3 is a block diagram illustrating components of an exemplary system in accordance with embodiments of the present disclosure.

FIG. 3 is a block diagram illustrating the components for performing the systems and methods discussed herein. FIG. 3 includes a confidence engine 300, network 315 and database 320. The confidence engine 300 can be a special purpose machine or processor and could be hosted by an application server, content server, social networking server, web server, email server, search server, content provider, third party server, user's computing device, and the like, or any combination thereof.

According to some embodiments, confidence engine 300 can be embodied as a stand-alone application that executes on a user device. In some embodiments, the confidence engine 300 can function as an application installed on the user's device, and in some embodiments, such application can be a web-based application accessed by the user device over a network. In some embodiments, the confidence engine 300 can be installed as an augmenting script, program or application (e.g., a plug-in or extension) to another application (e.g., Yahoo! Mail®).

The database 320 can be any type of database or memory, and can be associated with a content server on a network (e.g., content server, a search server or application server) or a user's device (e.g., device 101-104 or device 200 from FIGS. 1-2). Database 320 comprises a dataset of data and metadata associated with local and/or network information related to users, services, applications, content and the like. Such information can be stored and indexed in the database 320 independently and/or as a linked or associated dataset. As discussed above, it should be understood that the data (and metadata) in the database 320 can be any type of information and type, whether known or to be known, without departing from the scope of the present disclosure.

According to some embodiments, database 320 can store data for users, e.g., user data. According to some embodiments, the stored user data can include, but is not limited to, information associated with a user's profile, user interests, user behavioral information, user attributes, user preferences or settings, user demographic information, user location information, user biographic information, and the like, or some combination thereof. In some embodiments, the user data can also include user device information, including, but not limited to, device identifying information, device capability information, voice/data carrier information, Internet Protocol (IP) address, applications installed or capable of being installed or executed on such device, and/or any, or some combination thereof. It should be understood that the data (and metadata) in the database 320 can be any type of information related to a user, content, a device, an application, a service provider, a content provider, whether known or to be known, without departing from the scope of the present disclosure.

According to some embodiments, database 320 can store data and metadata associated with a user from an assortment of media and/or service providers and/or platforms. For example, the information can be related to, but not limited to, content type or category, information associated with the sender or recipient(s) of a message, information associated with content or text included in a message, and any other type of known or to be known attribute or feature associated with a message or content of a message, or some combination thereof.

According to some embodiments, information related to, derived from or otherwise determined from analysis of a user's inbox can be stored in database 320 as n-dimensional vector (or feature vector), where the information associated with each message can be translated as a node on the n-dimensional vector for an inbox. In some embodiments, each message can have its own vector where the information included therein can be represented by the nodes on a respective vector. In some embodiments, as messages are sent/received, detected and/or tracked, information corresponding thereto can also be stored in the database 320 in a similar manner.

Database 320 can store and index inbox/message information in database 320 as linked set of inbox/message data and metadata, where the data and metadata relationship can be stored as the n-dimensional vector. Such storage can be realized through any known or to be known vector or array storage, including but not limited to, a hash tree, queue, stack, VList, or any other type of known or to be known dynamic memory allocation technique or technology. It should be understood that any known or to be known computational analysis technique or algorithm, such as, but not limited to, cluster analysis, data mining, Bayesian network analysis, Hidden Markov models, artificial neural network analysis, logical model and/or tree analysis, and the like, and be applied to determine, derive or otherwise identify vector information for messages within an inbox.

For purposes of the present disclosure, as discussed above, messages (which are stored and located in database 320) as a whole are discussed within some embodiments; however, it should not be construed to limit the applications of the systems and methods discussed herein. That is, while reference is made throughout the instant disclosure to messages (e.g., email messages), other forms of messages (e.g., social media messages, Instant Messages (IMs)) and the content included therein, including, text, audio, images, multimedia, RSS feed information, can be used without departing from the scope of the instant application, which can thereby be communicated and/or accessed and processed by the confidence engine 300 according to the systems and methods discussed herein.

As discussed above, with reference to FIG. 1, the network 315 can be any type of network such as, but not limited to, a wireless network, a local area network (LAN), wide area network (WAN), the Internet, or a combination thereof. The network 315 facilitates connectivity of the confidence engine 300, and the database of stored resources 320. Indeed, as illustrated in FIG. 3, the confidence engine 300 and database 320 can be directly connected by any known or to be known method of connecting and/or enabling communication between such devices and resources.

The principal processor, server, or combination of devices that comprises hardware programmed in accordance with the special purpose functions herein is referred to for convenience as confidence engine 300, and includes mapping module 302, weighting module 304, graph module 306 and profile generation module 308. It should be understood that the engine(s) and modules discussed herein are non-exhaustive, as additional or fewer engines and/or modules (or sub-modules) may be applicable to the embodiments of the systems and methods discussed. The operations, configurations and functionalities of each module, and their role within embodiments of the present disclosure will be discussed below.

Figure 4:
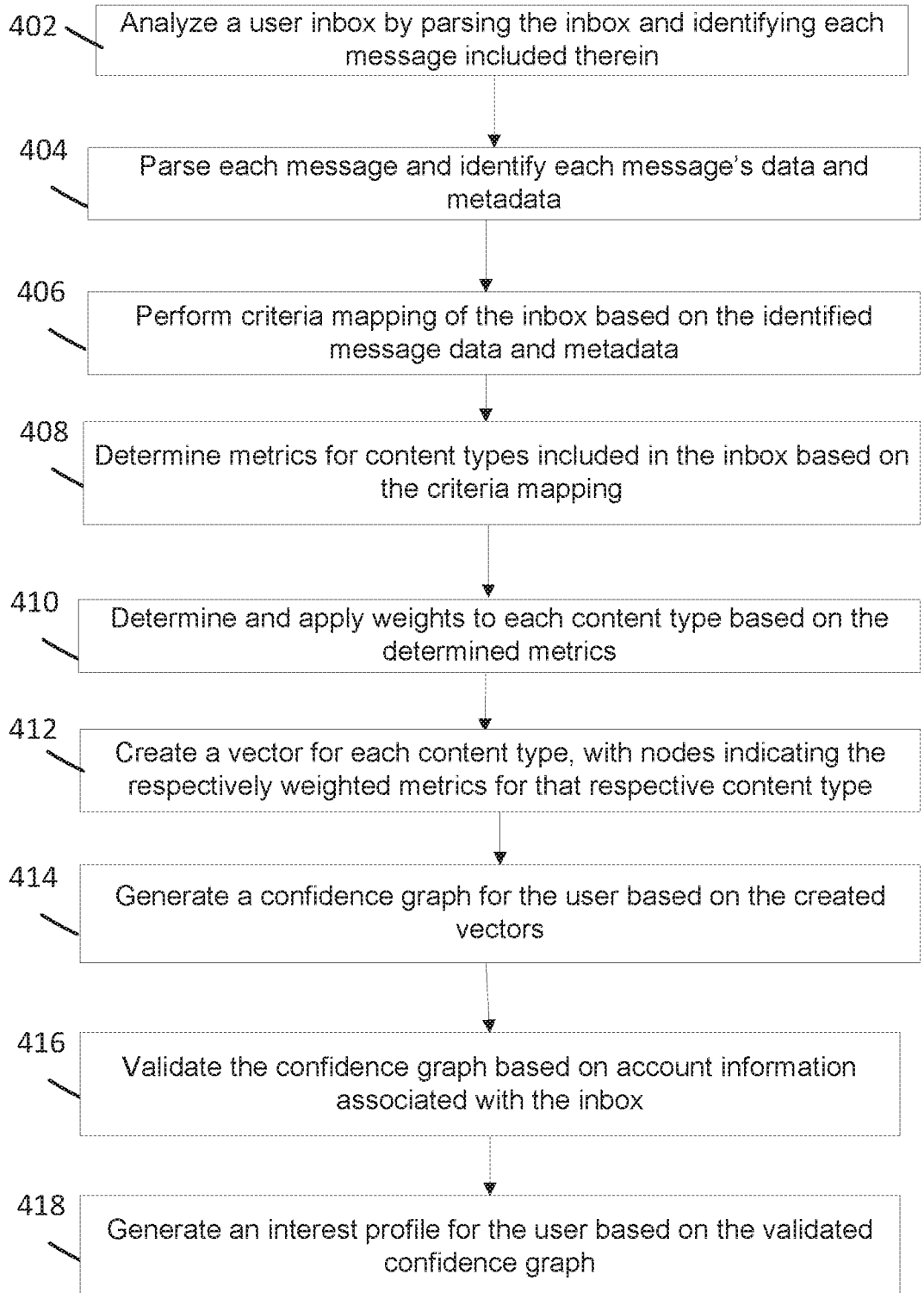
FIG. 4 is a block diagram illustrating a data flow of an exemplary system in accordance with some embodiments of the present disclosure.

Turning to FIG. 4, an overall data flow of the interest mapping, confidence graphing and profile generating framework is illustrated. Process 400 of FIG. 4 provides embodiments for devices (e.g., content servers, email servers, user devices, and the like) to process data in a novel manner, via the disclosed confidence graph, thereby leading to increased efficiency and effectiveness in the protocol utilized for sending users digital content.

Steps 402-406 of Process 400 are performed by the mapping module 302 of the confidence engine 300; Steps 408-410 are performed by the weighting module 304; Steps 412-416 are performed by the graph module 306; and Step 418 is performed by the profile generation module 308.

Process 400 begins with Step 402 where a user's inbox is identified and analyzed. As discussed above and in more detail herein, the disclosed systems and methods provide for a novel approach in mapping user data via the generation of a confidence graph that is based on user inbox data. The user inbox data is derived, determined, extracted or otherwise identified from the messages and account information associated with a user's inbox (or user's messaging/email account). Thus, Step 402 involves parsing the inbox data of a user's inbox and identifying each message included therein.

In some embodiments, Step 402 can involve, or be bound by, a criteria such that only a set of all the messages in the inbox are identified. Such criteria can reference a time period, location associated with a message(s) (e.g., where was the message sent from, what location does the message reference, where was the message received, and the like), an identity of a sender, other recipients of a message (e.g., if it was a group message), which platform the message originated from (e.g., was it a message from another messaging platform), is the message unread, was the message acted upon (e.g., was it forwarded, responded to, saved, categorized or deleted), or how was the message checked/read (e.g., did the user open and read the message from an application on his/her mobile device), and the like, or some combination thereof.

In some embodiments, the account information of the user's inbox is also identified, as discussed in more detail below in relation to Steps 410 and 416-418. The account information includes information indicating, but not limited to, the account's age, frequency of account access, frequency of use, types of communication features used, and the like.

In Step 404, each identified message from Step 402 is then parsed and analyzed such that the message data and metadata included in each message is identified (or extracted). Step 404 results in the identification of the types of content and information the message is referencing. For example, if the message includes a travel itinerary, the message data indicates the travel information, and the message metadata can reference the sender (e.g., was it booked through a travel website or directly from an airline's portal).

In Step 406, the confidence engine 300 performs criteria mapping of the inbox based on the identified data and metadata derived from Step 404 for each identified message. Criteria mapping is a process that involves identifying (or extracting) from each message the message data and metadata (from Step 404), then determining how many types of content (or messages) have been identified based on the message data and metadata. For example, if 2 of the messages in the inbox include content associated with purchased airplane tickets, then these would be mapped from the inbox as "travel" messages.

In Step 408, based on such mapping, metrics for each of the identified content types are determined. The metrics indicate a compiled count, tally or frequency of how many of each of the types of messages are included in the user's inbox. These metrics are coded such that messages of a particular category are grouped/clustered together (or their data/metadata is grouped) so that engine 300 can compile a mapping (or model) that represents the user's activity through/from his/her inbox.

For example, the user's inbox is determined to include 9 messages: 3 of them relate to travel, 4 of them relate to shopping (e.g., transaction confirmation emails) and 2 of them are trade confirmations from financial institutions. Thus, the messages are coded per group and the metrics for each code indicate the amount of these messages within the inbox. Thus, as a result of Steps 402-408, there are 3 content types, and the coded metrics are as follows: i) travel—33%; ii) shopping—44%; and iii) financial—22%.

In Step 410, weights for each content type (i.e., coded category grouping) are determined based on the metrics for each content type. The weights also take into account the account information for the user's inbox so that each content type, and each type's metrics account for the heuristics present in the user's inbox account. For example, building on the above example, if a travel message type has a metric of 33%, and a financial message type has a metric of 22%, yet the financial messages occurred within the last 2 days while the travel messages were dated over a month ago, then the financial messages may be weighted more than the travel messages. This will show that the weights, while being based on the metrics for the messages, reflect the more recent activity in the user's account. Thus, for the user's inbox, a unique weightage mix is determined and applied to the user data from the inbox.

In Step 412, a vector for each content type is created, where the nodes on each vector are based on the weighted metrics for a respective content type. The vector comprises information indicating the data and metadata identified from messages for each content type, and can also include the account information heuristics (e.g., how recent, frequent, and the like, as discussed above). The engine 300 can create the vectors using any known or to be known n-dimensional feature vector technique, algorithm or mechanism, as discussed above, including, for example, computer vision, neural networks or Bayesian approaches, and the like.

In Step 414, having created vectors for each content type that indicate the data, metadata and heuristics of each, the engine 300 then creates a confidence graph that quantifies such parameters to represent the user's inbox (and the user). The confidence graph can be n-dimensional (e.g., 3-dimensional) compilation of the vectors generated in Step 412 that represents the scoring of how messages in the user's inbox correspond to a user's interests/activities. For example, high scores for types of messages (or message content) would signify high confidence that the user is actually interested in the content type; and vice versa for low scores.

In Step 416, in some embodiments, the confidence graph is validated based on the account information associated with the inbox. That is, the confidence graph is validated based on, for example, account age, frequency of account access, frequency of use, types of communication features used from/within the account in order to ensure that the data is valid (or at least satisfies a threshold). For example, if an account (e.g., the user's inbox) is 10 years old, the (vector) data that is over 3 years old may not be an accurate portrayal of the user's current interests and can be filtered out from the confidence graph. As discussed above, the confidence graph is a dynamic digital representation of the user's current interests; therefore, if information is not recent, or does not satisfy a predetermined frequency value, then it may be discarded. This could involve modifying the confidence graph as a result of the validation occurring in Step 416 to ensure the integrity of the confidence graph.

In some embodiments, the confidence graph can be cross-verified against other similar users. This can involve identifying users that have the same type of messages (satisfying a threshold amount—for example, using the above example, if another user has messages of shopping, travel and school, this could be used to cross-verify the created confidence graph because 2 out of the 3 content types exist in common, which could satisfy the threshold here). The confidence graphs can be compared, and if the comparison results in a deviation satisfying a threshold amount, then the confidence graph created in Step 414 can be validated as being based on and comprising authentic data of the user.

Step 416's validation can be performed by the engine performing any known or to be known statistical analysis technique, algorithm or technique to compare the confidence graph against the account information heuristics or to perform the cross-validation technique—for example, engine 300 can utilize any known or to be known machine learning algorithm, computational analysis, statistical analysis or technology, such as, but not limited to, vector analysis, cluster analysis, data mining, Bayesian network analysis, Hidden Markov models, artificial neural network analysis, logical model and/or tree analysis, and the like.

In Step 418, an interest profile for the user is generated (created) based on the validated confidence graph. The interest profile provides an ordered referendum on the user that indicates what the user finds most interesting at that time, the user's performed, current or upcoming activities, and the frequency, recency and/or projected indicators as to when they are next to occur. As discussed below, this can be leveraged in order to provide the user with the most relevant digital content at that time.

In some embodiments, Step 418 can involve updating an existing interest profile for a user. That is, the steps of Process 400 can be recursively performed according to a detected trigger, which can include, but is not limited to, a time period, when a new message is received, when a user logs into his/her account, when a user action is detected (e.g., a message is read, sent or otherwise acted on), when he/she logs out, or at preset times/dates that the user, system or engine 300 sets, and the like, or some combination thereof. Thus, a user's interest profile can provide an up-to-date, dynamically updated digital representation of the user's interests at exact moments in time, which can lead to the most opportune content being readily available and provided to the user.

In some embodiments, confidence graphs and the interest profiles generated therefrom can be per user, or can be based on a grouping of users set according to a criteria value—for example, based on demographic information, geographic location information, types of activities/messages, timing, and the like.

In some embodiments, content providers can leverage a confidence graph for a user to ensure the viability, authenticity and accuracy of an interest graph for the user. Such validation of interest graphs based on the confidence graph can be performed in a similar manner as discussed above by comparing and filtering out the non-threshold satisfying data from the interest graph using the statistical analysis techniques discussed in relation to Step 416. Thus, confidence graphs not only provide a more accurate portrayal of user interest data for a user than interest graphs, but they can also be used to ensure the viability of the interest graph data, which is a key technical advantage content providers can leverage when utilizing either form of graph when providing content to users.

Figure 5:
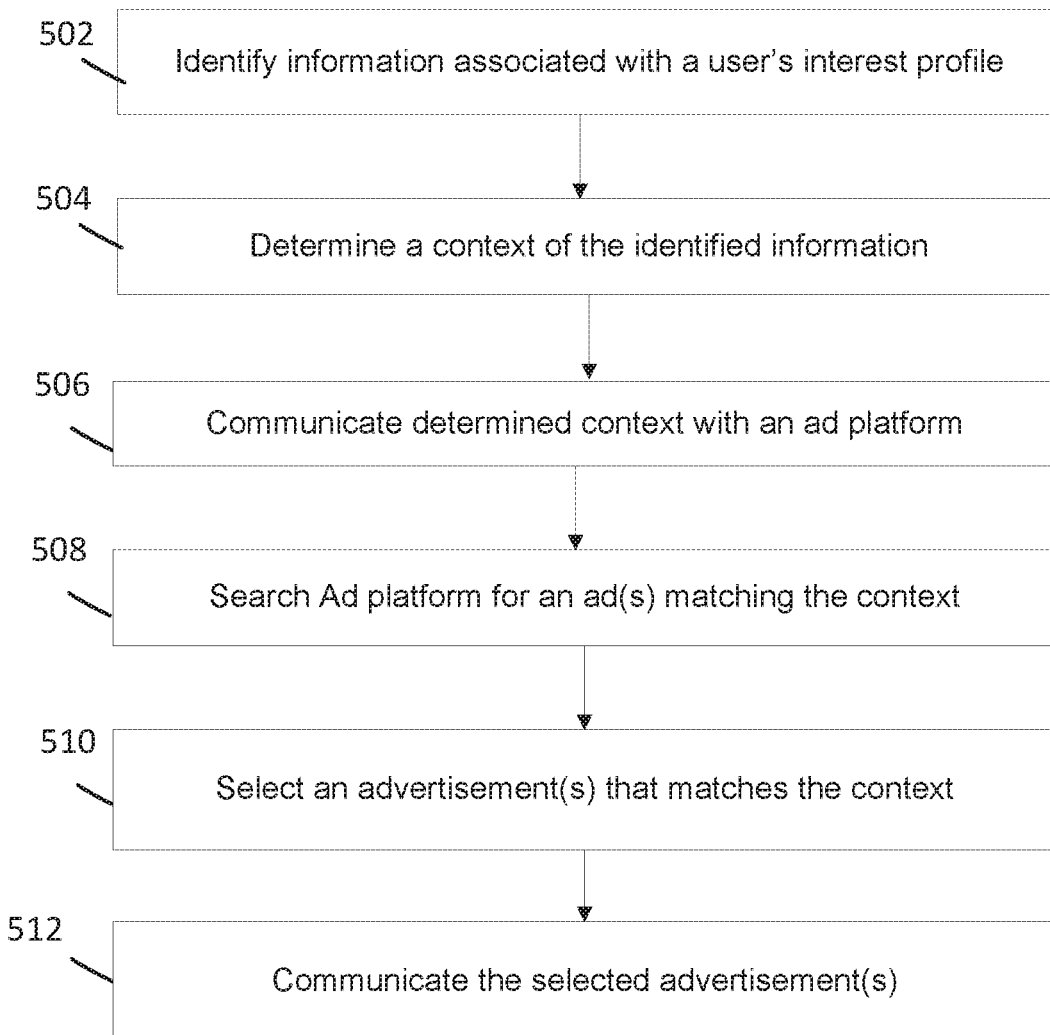
FIG. 5 is a block diagram illustrating a data flow of an exemplary system in accordance with some embodiments of the present disclosure.

FIG. 5 is a work flow example 500 for serving related digital media content based on the information associated with a generated interest profile, as discussed above in relation to FIGS. 3-4. In some embodiments, the content can be associated with or comprising advertisements (e.g., digital advertisement content). Such content, referred to as "interest information" for reference purposes only, can include, but is not limited to, information associated with an object a user received in his/her mailbox (e.g., a message or piece of media included within a message, for example), a context of a user's activity on a network and the like, and/or some combination thereof.

As discussed above, reference to an "advertisement" should be understood to include, but not be limited to, digital media content that provides information provided by another user, service, third party, entity, and the like. Such digital ad content can include any type of known or to be known media renderable by a computing device, including, but not limited to, video, text, audio, images, and/or any other type of known or to be known multi-media. In some embodiments, the digital ad content can be formatted as hyperlinked multi-media content that provides deep-linking features and/or capabilities. Therefore, while the content is referred as an advertisement, it is still a digital media item that is renderable by a computing device, and such digital media item comprises digital content relaying promotional content provided by a network associated third party.

In Step 502, current interest information is identified. As discussed above, the interest information can be based any of the information utilized or generated from/during the dynamic confidence graph and interest profile generation outlined above with respect to FIG. 4. For purposes of this disclosure, Process 500 will refer to single user's profile for serving additional content; however, it should not be construed as limiting, as any number of users and interest profiles, as well as programs used and/or content items rendered or received can form such basis, without departing from the scope of the instant disclosure.

In Step 504, a current context is determined based on the identified interest information. This context forms a basis for serving content related to the interest information. In some embodiments, the context can be in accordance with a user's latest transaction (determined from the last update of the confidence graph/interest profile), as discussed above in relation to FIGS. 3-4. For example, a user just purchased a plane ticket to Dallas, TX, and received a confirmation itinerary email in her inbox; therefore, the context identified in Step 504 can be related to "travel" or, more specifically, "Dallas, TX", and can be leveraged in order to identify digital content related to such activity. In some embodiments, the identification of the context from Step 504 can occur before, during and/or after the analysis detailed above with respect to Process 400, or it can be a separate process altogether, or some combination thereof.

In Step 506, the determined context is communicated (or shared) with a content providing platform comprising a server and database (e.g., content server 106 and content database 107, and/or advertisement server 130 and ad database). Upon receipt of the context, the server performs (e.g., is caused to perform as per instructions received from the device executing the visual recognizer engine 300) a search for a relevant digital content within the associated database. The search for the content is based at least on the identified context.

In Step 508, the server searches the database for a digital content item(s) that matches the identified context. In Step 510, a content item is selected (or retrieved) based on the results of Step 508. In some embodiments, the selected content item can be modified to conform to attributes or capabilities of the page, interface, message, platform, application or method upon which the content item will be displayed, and/or to the application and/or device for which it will be displayed. In some embodiments, the selected content item is shared or communicated via the application the user is utilizing to view, render and/or interact with a media, content or object item. Step 512. In some embodiments, the selected content item is sent directly to a user computing device for display on the device and/or within the UI displayed on the device's display. In some embodiments, the selected content item is displayed within a portion of the interface or within an overlaying or pop-up interface associated with a rendering interface displayed on the device.

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium for execution by a processor. Modules may be integral to one or more servers, or be loaded and executed by one or more servers. One or more modules may be grouped into an engine or an application.

For the purposes of this disclosure the term "user", "subscriber" "consumer" or "customer" should be understood to refer to a user of an application or applications as described herein and/or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

What is claimed is:

1. A method comprising:
identifying, via a computing device, an inbox of a user comprising a set of messages;
parsing, via the computing device, each identified message in the set;
identifying, via the computing device, based on said parsing, message data and metadata for each message;
identifying, via the computing device, a criteria associated with a content recommendation, said criteria corresponding to a respective content type;
analyzing, via the computing device, the message data and metadata and identifying a number of content types including said respective content type based on said analysis;
generating, via the computing device, based on said analysis, a confidence graph comprising an entry for each content type of the number of identified content types, said confidence graph comprising a score for each identified content type, the score for said respective content type being based on the number of messages in the set mapping to said criteria corresponding to said respective content type, said respective content type's score indicating a degree of confidence in the user's interest in said respective content type; and
generating, via the computing device, an interest profile for the user based on said generated confidence graph comprising the score for said respective content type, the interest profile comprising information indicating an interest of the user in said respective content type.

2. The method of claim 1, further comprising:
receiving, via the computing device, a request to send the user digital content; and
analyzing, via the computing device, said interest profile, and based on said analysis, identifying information indicating said respective content type.

3. The method of claim 2, wherein said respective content type is identified based on said mappings in said confidence graph.

4. The method of claim 2, further comprising:
communicating, by the computing device, information indicating said respective content type over a network in response to said request.

5. The method of claim 1, further comprising:
identifying, on a network, another user with a confidence graph having similar values within a threshold amount; and
cross-validating the confidence graph of the user by performing statistical analysis on the confidence graph based on the confidence graph of the other user, wherein said interest profile is generated based on said validated version of the confidence graph.

6. The method of claim 1, further comprising:
monitoring said inbox for a trigger;
detecting said trigger; and
recursively updating said confidence graph based on said detected trigger, said recursive updating comprising performing said steps for a new set of messages each time said trigger is detected.

7. The method of claim 6, wherein said trigger is selected from a group consisting of: a time period, when a new message is received, when the user logs into an account of the inbox, when a user action is detected, when the user logs out of the account, and at preset time or date.

8. The method of claim 1, further comprising:
analyzing the interest profile, and based on said analysis, identifying interest information for the user;
causing communication, over the network, of said interest information to an advertisement platform to obtain a digital content item comprising digital advertisement content associated with said interest information; and
communicating said identified digital content item to said user for display in association with an interface of the inbox.

9. A non-transitory computer-readable storage medium tangibly encoded with computer-executable instructions, that when executed by a computing device, performs a method comprising:
identifying, via the computing device, an inbox of a user comprising a set of messages;
parsing, via the computing device, each identified message in the set;
identifying, via the computing device, based on said parsing, message data and metadata for each message;
identifying, via the computing device, a criteria associated with a content recommendation, said criteria corresponding to a respective content type;

analyzing, via the computing device, the message data and metadata and identifying a number of content types including said respective content type based on said analysis;

generating, via the computing device, based on said analysis, a confidence graph comprising an entry for each content type of the number of identified content types, said confidence graph comprising a score for each identified content type, the score for said respective content type being based on the number of messages in the set of messages mapping to said criteria corresponding to said respective content type, said respective content type's score indicating a degree of confidence in the user's interest in said respective content type; and generating, via the computing device, an interest profile for the user based on said generated confidence graph comprising the score for said respective content type, the interest profile comprising information indicating an interest of the user in said respective content type.

10. The non-transitory computer-readable storage medium of claim 9, further comprising:

receiving, via the computing device, a request to send the user digital content; and analyzing, via the computing device, said interest profile, and based on said analysis, identifying information indicating said respective content type.

11. The non-transitory computer-readable storage medium of claim 10, wherein said respective content type is identified based on said mappings in said confidence graph.

12. The non-transitory computer-readable storage medium of claim 10, further comprising:

communicating, by the computing device, information indicating said respective content type over a network in response to said request.

13. The non-transitory computer-readable storage medium of claim 9, further comprising:

identifying, on a network, another user with a confidence graph having similar values within a threshold amount; and cross-validating the confidence graph of the user by performing statistical analysis on the confidence graph based on the confidence graph of the other user, wherein said interest profile is generated based on said validated version of the confidence graph.

14. The non-transitory computer-readable storage medium of claim 9, further comprising:

monitoring said inbox for a trigger;

detecting said trigger; and recursively updating said confidence graph based on said detected trigger, said recursive updating comprising performing said steps for a new set of messages each time said trigger is detected.

15. The non-transitory computer-readable storage medium of claim 6, wherein said trigger is selected from a group consisting of: a time period, when a new message is received, when the user logs into an account of the inbox, when a user action is detected, when the user logs out of the account, and at preset time or date.

16. A computing device comprising:

a processor; and a non-transitory computer-readable storage medium for tangibly storing thereon program logic for execution by the processor, the program logic comprising:

logic executed by the processor for identifying an inbox of a user comprising a set of messages; logic executed by the processor for parsing each identified message in the set;

logic executed by the processor for identifying based on said parsing, message data and metadata for each message;

logic executed by the processor for identifying a criteria associated with a content recommendation, said criteria corresponding to a respective content type;

logic executed by the processor for analyzing the message data and metadata and identifying a number of content types including said respective content type based on said analysis;

logic executed by the processor for generating based on said analysis, a confidence graph comprising an entry for each content type of the number of identified content types, said confidence graph comprising a score for each identified content type, the score for said respective content type being based on the number of messages in the set mapping said criteria corresponding to said respective content type, said respective content type's, the score indicating a degree of confidence in the user's interest in said respective content type; and logic executed by the processor for generating an interest profile for the user based on said generated confidence graph comprising the score for said respective content type, the interest profile comprising information indicating an interest of the user in said respective content type.

17. The computing device of claim 16, further comprising:

logic executed by the processor for receiving a request to send the user digital content; and logic executed by the processor for analyzing said interest profile, and based on said analysis, identifying information indicating said respective content type, wherein said respective content type is identified based on said mappings in said confidence graph.

18. The computing device of claim 17, further comprising:

logic executed by the processor for communicating information indicating said respective content type over a network in response to said request.

19. The computing device of claim 16, further comprising:

logic executed by the processor for identifying, on a network, another user with a confidence graph having similar values within a threshold amount; and logic executed by the processor for cross-validating the confidence graph of the user by performing statistical analysis on the confidence graph based on the confidence graph of the other user, wherein said interest profile is generated based on said validated version of the confidence graph.

20. The computing device of claim 16, further comprising:

logic executed by the processor for monitoring said inbox for a trigger;

logic executed by the processor for detecting said trigger; and logic executed by the processor for recursively updating said confidence graph based on said detected trigger, said recursive updating comprising performing said steps for a new set of messages each time said trigger is detected.

* * * * *